United States Patent Office 3,339,678
Patented Sept. 5, 1967

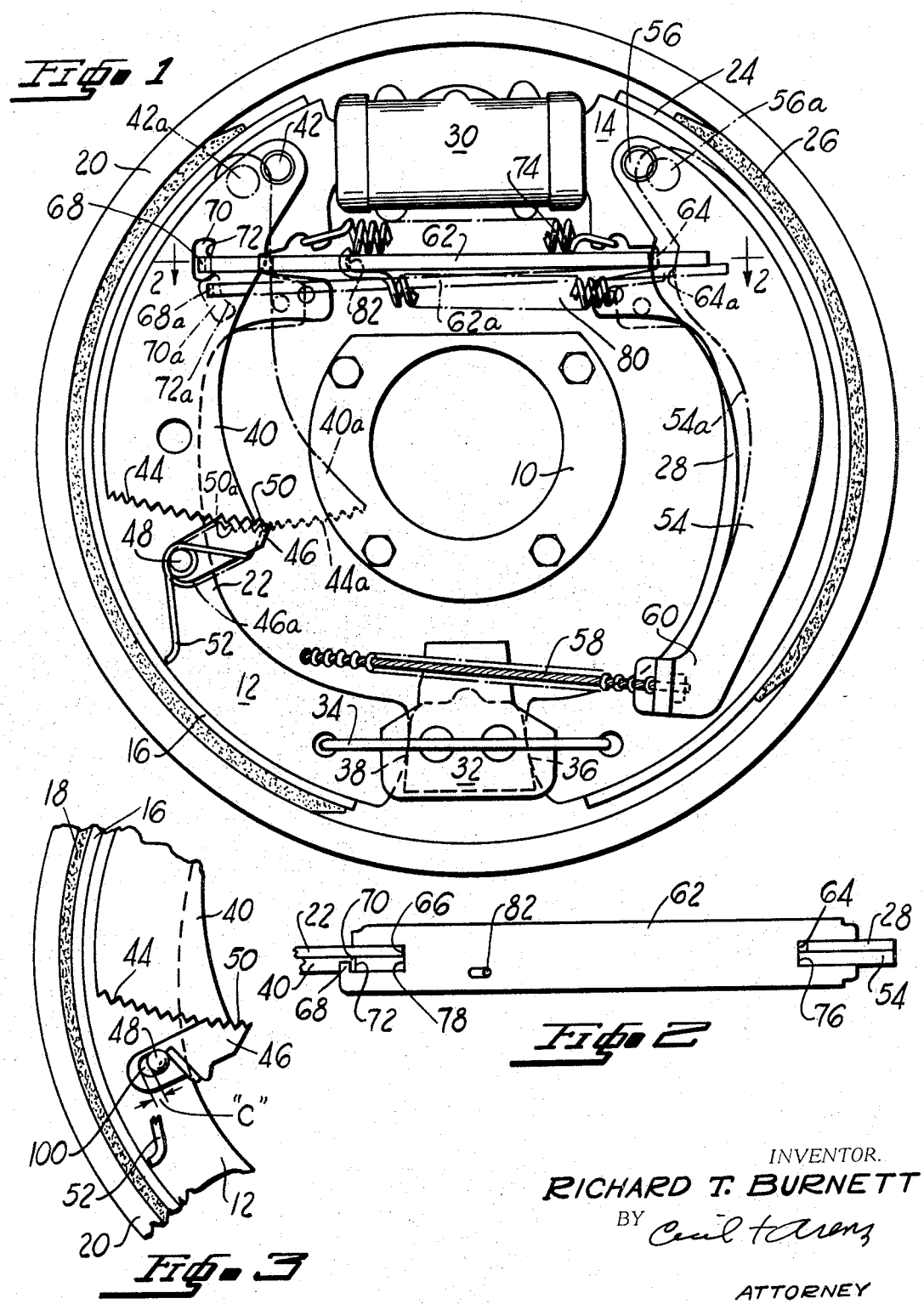

3,339,678
AUTOMATIC ADJUSTER FOR NON-SERVO BRAKE
Richard T. Burnett, South Bend, Ind., assignor to The Bendix Corporation, a corporation of Delaware
Filed Oct. 22, 1965, Ser. No. 501,573
12 Claims. (Cl. 188—79.5)

ABSTRACT OF THE DISCLOSURE

A mechanism for adjusting the position of a pair of brake shoes of a non-servo brake with respect to their associated drum to compensate for lining wear comprising a lost motion linkage connecting said pair of shoes in a manner such that spreading of said shoes beyond a predetermined amount establishes said shoes in a new release position adjacent said drum.

This application is a continuation-in-part of application Ser. No. 335, 962, filed Jan. 6, 1964, now abandoned.

An object of this invention is to provide a non-servo type of brake with an automatic adjusting mechanism for automatically adjusting the released position of the brake shoes to compensate for wear of the brake linings on the brake shoes.

Another object of the invention is to provide a non-servo type of brake with an automatic adjustment arrangement wherein a cable connected to a parking brake lever need not be adjusted to compensate for wear of the brake linings.

Other objects of the invention will become apparent from the following description with reference to the drawing wherein:

FIGURE 1 is a front elevational view of a brake assembly;
FIGURE 2 is a view taken along section line 2—2 of FIGURE 1; and
FIGURE 3 is a partial view of a modified version of the brake adjuster of FIGURE 1.

Referring to FIGURE 1, a backing plate 10 is adapted to be attached to a stationary part of a vehicle, such as an axle flange (not shown), and has a pair of brake shoes 12 and 14 slidably mounted thereon. The brake shoe 12 comprises an arcuate rim 16 having a friction lining 18 connected thereto at its outer face for engagement with a rotatable drum 20 and a transverse web 22 extending from the inner face of the rim 16. The brake shoe 14 has an arcuate rim 24 having a friction lining 26 secured to its outer face for engagement with the brake drum 20 and a transverse web 28 extending from the inner face of the rim 24. A fluid motor 30 is disposed between one pair of adjacent ends of the brake shoes and a stationary anchor 32 is disposed between the other pair of opposed brake shoe ends. A resilient member 34 is operatively connected to each of the brake shoe webs to hold the ends of the webs in engagement with the surfaces 36 and 38 of the anchor block 32.

An adjusting lever 40 is pivotally mounted to the web 22 of the brake shoe 12 by a rivet pin 42 and has a toothed surface 44 at its free end. A pawl or positioning member 46 is located opposite the free end of the adjusting lever 40 and is pivotally mounted to the web 22 of the brake shoe 12 by a rivet pin 48. The pawl 46 has a toothed surface end 50 mating with and biased by a spring 52 into engagement with the toothed end surface 44 of the lever 40. The toothed surfaces 44 and 50 cooperate to allow pivoting of the lever 40 in a counterclockwise direction but preventing pivoting of the lever 40 in a clockwise direction. A parking brake lever 54 is pivotally secured to the web 28 of the brake shoe 14 by a rivet pin 56. A cable 58 is attached to the free end 60 of the parking brake lever 54 and is attached to a hand lever (not shown) in the passenger compartment of a vehicle.

A rigid strut 62 extends between the two brake shoes 12 and 14 and is slotted at each end thereof with one of the slots 64 slidably receiving the parking brake lever 54 and the web 28 of the brake shoe 14 therein, and the other slot 66 slidably receiving the adjusting lever 40 and the web 22 of the brake shoe 12 therein. The strut 62 has a projection 68 extending into an opening 70 of the adjusting lever 40 which, in the brake release position, is maintained at a clearance from the inner edge 72 of the opening 70 to provide a lost-motion connection between the strut 62 and the lever 40. A shoe to shoe return spring 74 is connected to the web of each shoe to retract the shoes to their released position. The adjusting lever 40 and the parking brake lever 54 are so arranged on the brake shoes 12 and 14 that the spring 74 will urge, during brake release position, the inner edge of the parking brake lever 54 and the inner edge of the adjusting lever 40 into engagement with the inner end edges 76 and 78, respectively, of the adjusting strut slots 64 and 66, respectively. Thus, in brake release position, the brake shoe 14 anchors on the adjusting strut 62 through the parking brake lever 54 and the brake shoe 12 anchors on the adjusting strut 62 through the adjusting lever 40. A spring 80 is connected at one end 82 to the strut 62 and at the other end to the brake shoe web 28 for biasing the adjusting strut 62 into engagement with the parking brake lever 54. Instead of utilizing the spring 80 for maintaining the strut 62 in contact with the lever 54, there could be utilized a pinned connection between the strut 62 and lever 54.

In operation, fluid pressure is applied to the wheel cylinder 30 thereby spreading the brake shoes 12 and 14 until the linings 18 and 26 thereof, respectively, engage the brake drum 20. Since the strut 62 is biased into engagement with the inner edge of the parking brake lever 54 by the spring 80, the strut will follow the movement of the brake shoe 14 thereby moving the projection 68 relative to the adjusting lever opening edge 72 while at the same time the lever 40 and the edge 72 thereof follow the spreading movement of the brake shoe 12, thus multiplying the relative movement between the adjusting strut projection 68 and the inner edge 72 of the adjusting lever opening 70. The end 60 of the parking lever 54 is retained from spreading movement with the brake shoe 14 by the cable 58 and thus the parking brake lever 54 pivots about the connection thereof to the cable during brake application. Each brake shoe will anchor on the anchor block 32 during brake application. If the travel required by the brake shoes to engage their respective linings in engagement with the brake drum 20 is greater than the clearance between the projection 68 and the inner edge 72 of the opening 70, then the projection 68 will engage the inner edge 72 and pivot the lever 40 about the pivot pin 42 whereby the toothed surfaces 44 and 50 will slide relative to each other to assume an adjusted relative position between levers 40 and 46. The adjusted position of the levers 40 and 46 in effect, increases the distance between the rim and the inner edge of the adjusting lever 40, which increase is transmitted by the strut 62 to adjust the position of the brake shoe 14. The different elements of the brake shoes and the adjusting lever are shown in phantom and given the same reference numeral with "a" attached thereto to illustrate the position of these different elements when the brake linings have worn their entire useful life. It should be noted that the point of connection of the cable to the parking brake lever 54 remains at substantially the same position relative to the backing plate and the parking brake lever is always in engagement with the strut 62 throughout the brake lining life. Therefore, no slack occurs in the cable resulting in eliminating adjustment of the cable to take up slack.

It should be understood that if a front wheel brake were utilized, the parking brake lever 54 would be left off the brake shoe 14 and the slot 64 of the adjusting strut 62 would receive only the web 28 of the brake shoe with the inner edge of the web anchoring against the inner end edge 76 of the slot 64.

Even when the parking brake lever 54 is used, the shoe 14 could anchor directly on strut 62, but this is not too desirable since it would be difficult to maintain a closely adjusted position of the parking brake lever relative to the strut and since lost-motion would occur in applying the brake by means of the parking brake lever.

FIGURE 3 illustrates a modified version of the adjuster insofar as the location of the lost motion connection is concerned. Those elements which are the same as in the previous embodiment have been given the same reference numerals since in this embodiment the remaining structure is the same with the exception that there no longer is a clearance between the projection 68 and the edge 72. The lost motion is now provided by the clearance "c" between a slot 100 provided in the pawl 46 and the pin 48. (The torsion spring 52 has been cut away to clearly show the slot 100.) In operation, the lever 40 will be pivoted by the strut 62 upon initial spreading of the shoes. The spring 52 will act on the pawl 46, forcing the same to follow movement of the lever 40 until clearance "c" is taken up, at which time the lever will pivot relative to the pawl 46 and assume a new position thereon to thereby adjust the released position of the brake shoes. Upon release of the brake, the return spring 74 will return the shoes and thereby return the lever 40 and pawl 46 through the clearance "c" to their released positions.

While the invention has been described with reference to specific embodiments, I intend to include within the scope of the following claims the equivalents which are apparent to those skilled in the art.

I claim:

1. A brake assembly comprising: a support member, a pair of brake shoes slidably mounted on said support member in end to end relationship, actuating means disposed between one pair of adjacent shoe ends, stationary anchoring means fixedly secured to said support member and disposed between the other pair of adjacent shoe ends, an adjusting member pivotally mounted on one of said shoes, a ratchet connection between said one brake shoe and said adjusting member constructed to allow pivotal movement of said adjusting member relative to said one shoe in a direction toward the other of said shoes and prohibiting relative movement therebetween in the opposite direction, a strut extending between said brake shoes and having abutment surfaces thereon on which said shoes anchor during shoe released position, said adjusting member engaging one of said abutments on said strut, said one shoe anchoring on said strut through said adjusting member, resilient means interconnecting said shoes for urging said shoes into released position, a lost-motion connection between said adjusting member and strut for pivoting said adjusting member relative to said one brake shoe upon spreading of said shoes beyond a predetermined amount fixed by said lost-motion connection, means maintaining an operative connection between said strut and the other of said brake shoes, whereby upon spreading of said shoes beyond said predetermined amount, said adjusting member is pivoted relative to said one shoe to assume a new position thereon thereby adjusting the released position of said brake shoes.

2. A brake assembly comprising: a support member, a pair of brake shoes slidably mounted on said support member in end to end relationship, hydraulic actuating means disposed between one pair of adjacent shoe ends, stationary anchoring means fixedly secured to said support member and disposed between the other pair of adjacent shoe ends, an adjusting member pivotally mounted on one of said shoes, a ratchet connection between said one brake shoe and said adjusting member constructed to allow pivotal movement of said lever relative to said one shoe in a direction toward the other of said shoes and prohibiting relative movement therebetween in the opposite direction, a strut extending between said brake shoes and having abutment surfaces thereon against which said shoes anchor during shoe released position, said adjusting member engaging one of said abutments on said strut, said one shoe anchoring on said strut through said adjusting member, a mechanical brake actuating lever pivotally mounted on said other shoe and engaging the other of said abutment surfaces on said strut, said other shoe anchoring on said strut through said mechanical brake actuating lever during brake released position, resilient means interconnecting said shoes for urging said shoes into released position, a lost-motion connection between said adjusting member and strut for pivoting said adjusting member relative to said one brake shoe upon spreading of said shoes beyond a predetermined amount fixed by said lost-motion connection, means maintaining an operative connection between said strut and said mechanical actuating lever, whereby upon spreading of said shoes beyond said predetermined amount, said adjusting member is pivoted relative to said one shoe to assume a new position thereon thereby adjusting the released position of said brake shoes.

3. A brake assembly comprising: a support member, a pair of T-shaped brake shoes slidably mounted on said support member in end to end relationship, actuating means disposed between one pair of adjacent shoe ends, stationary anchoring means fixedly secured to said support member and disposed between the other pair of adjacent shoe ends, an adjusting lever pivotally mounted on the web of one of said shoes, a ratchet connection between said one brake shoe and said lever allowing pivotal movement of said lever relative to said one shoe in a direction toward the other of said shoes and prohibiting relative movement therebetween in the opposite direction, a strut extending between said brake shoes and having an open end slot at one end thereof receiving said lever and the web of said one brake shoe therein, said lever engaging the closed end of said slot, said one shoe anchoring on said closed end through said lever during brake released position, an anchoring surface on the other end of said strut on which the other of said shoes anchors during brake released position, resilient means interconnecting said shoes for urging said shoes into brake released position, an opening in said lever, a projection extending from said strut into said opening and being spaced from the edge of said opening which is located between the closed end of said slot and said projection to provide a lost-motion connection therebetween for pivoting said lever relative to said one brake shoe upon spreading of said shoes beyond a predetermined amount fixed by said lost-motion connection, means maintaining an operative connection between said strut and the other of said brake shoes, whereby upon spreading of said shoes beyond said predetermined amount, said adjusting lever is pivoted relative to said one shoe to assume a new position thereon thereby adjusting the released position of said brake shoes.

4. A brake assembly comprising: a support member, a pair of T-shaped brake shoes slidably mounted on said support member in end to end relationship, actuating means disposed between one pair of adjacent shoe ends, stationary anchoring means fixedly secured to said support member and disposed between the other pair of adjacent shoe ends, an adjusting lever pivotally mounted on the web of one of said shoes, a ratchet connection between said one brake shoe and said lever allowing pivotal movement of said lever relative to said one shoe in a direction toward the other of said shoes and prohibiting relative movement therebetween in the opposite direction, a strut extending between said brake shoes and having an open end slot at each end thereof one of which receives said lever and the web of said one brake shoe therein, and the other of which receives the web of the other of said shoes therein, said lever and the web of said other shoe engaging the closed end of their respective slots for anchoring thereon during brake released position, said one shoe anchoring through said lever on its respective closed end of said strut during brake released position, resilient means interconnecting said shoes for urging said shoes into brake released position, an opening in said lever, a projection extending from said strut into said opening and being spaced from the edge of said opening which is located between the closed end of said one slot and said projection to provide a lost-motion connection therebetween for pivoting said lever relative to said one brake shoe upon spreading of said shoes beyond a predetermined amount fixed by said lost-motion connection, resilient means urging said strut in a direction away from said one brake shoe into engagement with said other brake shoe, whereby upon spreading of said shoes beyond said predetermined amount, said adjusting lever is pivoted relative to said one shoe to assume a new position thereon thereby adjusting the released position of said brake shoes.

5. A brake assembly comprising: a support member, a pair of brake shoes slidably mounted on said support member in end to end relationship, hydraulic actuating means disposed between one pair of adjacent shoe ends, stationary anchoring means fixedly secured to said support member and disposed between the other pair of adjacent shoe ends, an adjusting lever pivotally mounted on the web of one of said shoes, a ratchet connection between said one brake shoe and said lever allowing pivotal movement of said lever relative to said one shoe in a direction toward the other of said shoes and prohibiting relative movement therebetween in the opposite direction, a mechanical brake actuator lever pivotally mounted on said other shoe, a strut extending between said brake shoes and having an open end slot at each end thereof receiving a respective one of said levers and webs of said brake shoes therein, each of said levers engaging the closed end of their respective slots, each of said shoes anchoring through their respective levers on their respective one of said closed ends of said strut during brake released position, resilient means interconnecting said shoes for urging said shoes into brake released position, an opening in said adjusting lever, a projection extending from said strut into said opening and being spaced from the edge of said opening which is located between the respective closed end of said slot and said projection to provide a lost-motion connection therebetween for pivoting said adjusting lever relative to said one brake shoe upon spreading of said shoes beyond a predetermined amount fixed by said lost-motion connection, resilient means urging said strut in a direction away from said one brake shoe into engagement with said mechanical actuator lever, whereby upon spreading of said shoes beyond said predetermined amount, said adjusting lever is pivoted relative to said one shoe to assume a new position thereon thereby adjusting the released position of said brake shoes.

6. A brake assembly as recited in claim 1 where said ratchet connection between said shoe and said lever comprises a pawl pivotally mounted on said one shoe adjacent a free end of said adjusting lever, a serrated surface on said free end of said adjusting lever, said pawl engaging said serrated surface of said adjusting lever, and resilient means urging said pawl into engagement with said serrated surface of said adjusting lever.

7. A brake assembly as recited in claim 3 wherein said ratchet connection between said shoe and said lever comprises a pawl pivotally mounted on the web of said one shoe adjacent a free end of said lever, a serrated surface on said free end of said adjusting lever, a mating serrated surface on said pawl engaging said serrated surface of said adjusting lever, and resilient means urging said mating surface of said pawl into engagement with said serrated surface of said adjusting lever.

8. A brake assembly comprising: a support member, a pair of brake shoes slidably mounted on said support member in end to end relationship, actuating means disposed between one pair of adjacent shoe ends, stationary anchoring means fixedly secured to said support member and disposed between the other pair of adjacent shoe ends, an adjusting member pivotally mounted on one of said shoes, a connection between said one brake shoe and said adjusting member constructed to allow pivotal movement of said adjusting member relative to said one shoe in a direction toward the other of said shoes and prohibit relative movement therebetween in the opposite direction, a strut extending between said brake shoes and having abutment surfaces thereon on which said shoes anchor during shoe released position, said adjusting member engaging one of said abutments on said strut, said one shoe anchoring on said strut through said adjusting member, resilient means interconnecting said shoes for urging said shoes into released position, means maintaining an operative connection between said strut and the other of said brake shoes, means operatively connecting said strut to said adjusting member for pivoting said adjusting member relative to said one brake shoe upon spreading of said shoes, means providing for a predetermined amount of spreading of said shoes prior to pivoting of said adjusting member by said strut, whereby upon spreading of said shoes beyond said predetermined amount, said adjusting member is pivoted relative to said one shoe to assume a new position thereon thereby adjusting the released position of said brake shoes.

9. A brake assembly comprising: a support member, a pair of brake shoes slidably mounted on said support member in end to end relationship, actuating means disposed between one pair of adjacent shoe ends, stationary anchoring means fixedly secured to said support member and disposed between the other pair of adjacent shoe ends, an adjusting member pivotally mounted on one of said shoes, a positioning member mounted on said one shoe coacting with said adjusting member to allow pivotal movement of said adjusting member relative to said positioning member in a direction toward the other of said shoes and prohibit relative movement therebetween in the opposite direction, a strut extending between said brake shoes and having abutment surfaces thereon on which said shoes anchor during shoe released position, said adjusting member engaging one of said abutments on said strut, said one shoe anchoring on said strut through said adjusting member, resilient means urging said shoes into released position, means maintaining an operative connection between said strut and the other of said brake shoes, and means operatively connecting said strut to said adjusting member for pivoting said adjusting member relative to said one brake shoe during spreading of said shoes, whereby upon relative movement between said adjusting member and said positioning member, said adjusting member assumes a new position on said one shoe thereby adjusting the released position of said brake shoes.

10. A brake assembly comprising: a support member, a pair of brake shoes slidably mounted on said support member in end to end relationship, actuating means disposed between one pair of adjacent shoe ends, stationary anchoring means fixedly secured to said support member and disposed between the other pair of adjacent shoe ends, and adjusting member pivotally mounted on one of said shoes, a positioning member mounted on said one shoe coacting with said adjusting member to allow pivotal movement of said adjusting member relative to said positioning member in a direction toward the other of said shoes and prohibit relative movement therebetween in the opposite direction, a strut extending between said brake shoes and having abutment surfaces thereon on which said shoes anchor during shoe released position, said adjusting member engaging one of said abutments on said strut, said one shoe anchoring on said strut through said adjusting member, resilient means urging said shoes into released position, means maintaining an operative connection between said strut and the other of said brake shoes, means operatively connecting said strut to said adjusting member for pivoting said adjusting member relative to said one brake shoe duing spreading of said shoes, means providing for a predetermined amount of spreading of said shoes prior to pivoting of said adjusting member relative to said positioning member by said strut, whereby upon spreading of said shoes beyond said predetermined amount, said adjusting member is pivoted relative to said positioning member to assume a new position on said one shoe thereby adjusting the released position of said brake shoes.

11. A brake assembly comprising: a support member, a pair of brake shoes slidably mounted on said support member in end to end relationship, actuating means disposed between one pair of adjacent shoe ends, stationary anchoring means fixedly secured to said support member and disposed between the other pair of adjacent shoe ends, and adjusting member pivotally mounted on one of said shoes, a positioning member mounted on said one shoe coacting with said adjusting member to allow pivotal movement of said adjusting member relative to said positioning member in a direction toward the other of said shoes to a new position therebetween and prohibit movement of said adjuster member from said new position relative to said positioning member in the opposite direction, a strut extending between said brake shoes and having abutment surfaces thereon on which said shoes anchor during shoe released position, said adjusting member engaging one of said abutments on said strut, said one shoe anchoring on said strut through said adjusting member, resilient means urging said shoes into released position, means maintaining an operative connection between said strut and other of said brake shoes, means operatively connecting said strut to said adjusting member for pivoting said adjusting member relative to said positioning member during spreading of said shoes, means providing for a predetermined amount of spreading of said shoes prior to pivoting of said adjusting member to said new position relative to said positioning member, whereby upon spreading of said shoes beyond said predetermined amount, said adjusting member is moved by said strut to said new position relative to said positioning member and assumes a new position on said one shoe thereby adjusting the released position of said brake shoes.

12. A brake assembly comprising: a support member, a pair of brake shoes slidably mounted on said support member in end to end relationship, actuating means disposed between one pair of adjacent shoe ends, stationary anchoring means fixedly secured to said support member and disposed between the other pair of adjacent shoe ends, and adjusting member pivotally mounted on one of said shoes, a positioning member slidably mounted on said one shoe coacting with said adjusting member to allow pivotal movement of said adjusting member relative to positioning member in a direction toward the other of said shoes and prohibit relative movement therebetween in the opposite direction, a strut extending between said brake shoes and having abutment surfaces thereon on which said shoes anchor during shoe released position, said adjusting member engaging one of said abutments on said strut, said one shoe anchoring on said strut through said adjusting member, resilient means urging said shoes into released position, means maintaining an operative connection between said strut and the other of said brake shoes, means operatively connecting said strut to said adjusting member for pivoting said adjusting member relative to said one brake shoe upon spreading of said shoes, means limiting slidable movement of said positioning member after a predetermined amount of spreading of said shoes, said positioning member and said adjusting member being so constructed to move together until said shoes have spread said predetermined amount, whereby upon spreading of said shoes beyond said predetermined amount, said adjusting member is pivoted relative to said positioning member to assume a new position on said one shoe thereby adjusting the released position of said brake shoes.

References Cited
UNITED STATES PATENTS

| | | | |
|---|---|---|---|
| 2,292,017 | 8/1942 | Smith | 188—79.5 |
| 2,570,398 | 10/1951 | Smith | 188—79.5 |

DUANE A. REGER, *Primary Examiner.*